United States Patent
Pinto et al.

[11] Patent Number: 5,938,328
[45] Date of Patent: Aug. 17, 1999

[54] PACKED BED STATIC MIXER

[75] Inventors: Martin de Tezanos Pinto; Richard F. Stoisits, both of Plano, Tex.

[73] Assignee: Atlantic Richfield Company, Los Angeles, Calif.

[21] Appl. No.: 09/111,342

[22] Filed: Jul. 7, 1998

[51] Int. Cl.[6] ...................................................... B01F 5/00
[52] U.S. Cl. ...................................... 366/174.1; 366/336
[58] Field of Search .................................... 366/336, 337, 366/338, 339, 340, 184, 175.2, 174.1

[56] References Cited

U.S. PATENT DOCUMENTS

| | | | |
|---|---|---|---|
| 2,583,206 | 1/1952 | Borck et al. | 366/338 |
| 2,894,732 | 7/1959 | Taber et al. | 366/336 |
| 3,554,496 | 1/1971 | Nusstein | 366/338 |
| 4,121,906 | 10/1978 | Olham et al. | 366/336 |
| 4,136,976 | 1/1979 | Leffelman | 366/336 |
| 4,204,775 | 5/1980 | Speer | 366/336 |
| 4,747,342 | 5/1988 | Schak et al. | 366/337 |
| 4,832,500 | 5/1989 | Brunold et al. | 366/339 |
| 4,932,786 | 6/1990 | Hihara et al. | 366/338 |
| 5,407,274 | 4/1995 | Woerheide et al. | 366/337 |
| 5,421,408 | 6/1995 | Stoisits et al. | 166/274 |

*Primary Examiner*—Tony G. Soohoo
*Attorney, Agent, or Firm*—Anderson, Levine & Lintel

[57] ABSTRACT

A packed bed static mixer, and a piping network including the same, is disclosed. The packed bed static mixer includes a vertical intake portion, within which packing material consisting of small elements, is disposed. The packing elements may be spheres, PALL RING elements, or the like, and are fabricated of a material suitable for the particular application of the static mixer. The size of the packing elements is maintained to be relatively small relative to the mixer, to provide numerous mixing vortices therewithin; the packing elements are randomly packed into the static mixer. Outlets are provided which extend horizontally and radially from the bottom of the static mixer, and are typically of smaller diameter than the intake portion. Because the mixing action depends upon the size of the vortices at the interstitial voids among the packing elements, the disclosed static mixer design may be readily scaled to various diameters.

16 Claims, 2 Drawing Sheets

PACKED BED STATIC MIXER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of fluid mechanics, and is more specifically directed to static mixers.

Pipelines of varying length and diameter are commonly called upon to transport flow streams having multiple phases; such flow streams are referred to in the art as multiphase flows. Multiphase flow transportation is commonly used in the oil and gas production industry for various reasons. For example, the production output of a hydrocarbon well generally includes multiple phases, namely oil and gas (and, undesirably, water).

Secondary recovery operations refer to those oil and gas production operations in which matter is injected into a producing hydrocarbon well in order to increase the production rate at which salable oil and gas may be retrieved; secondary recovery operations also may extend the producing life of the well. Substances that are commonly injected into hydrocarbon wells include steam, water, and gas (either natural gas, or a non-hydrocarbon gas such as carbon dioxide). In particular, secondary recovery operations involving the injection of gas may inject gas into the formation itself to displace oil that is otherwise resident within the pores of the formation. In some wells, the alternating injection of water and gas into the well has been found to provide improved secondary recovery performance, as gas trapped in the formation alters reservoir fluid mobilities and results in improved waterflood sweep efficiency. As a result, the alternating injection of water and gas has been found to increase production rates and reduce water handling costs.

It has been found that, in certain wells such as those in the North Slope of Alaska, reduction in the water-gas cycle of alternating water and gas injection improves the efficiency of the carbon dioxide recovery process, adds incremental reserves, and improves lift efficiency of the injected wells. As described in U.S. Pat. No. 5,241,408, issued Jun. 6, 1995, commonly assigned herewith and incorporated hereinto by this reference, the simultaneous injection of gas and water into the formation has been found to be extremely beneficial in secondary recovery operations. This simultaneous injection not only achieves the ultimate reduction of the water-gas cycle of alternating water and gas injection, but also reduces the facilities cost associated with separate water and gas piping networks. As discussed in the above-referenced U.S. Pat. No. 5,241,408, successful simultaneous water and gas injection requires uniform distribution of the gas and liquid mixture throughout the piping network.

Splitting or branching of a main multiphase stream into two or more sub-streams is necessary in the piping network used for applications such as simultaneous water and gas injection, to keep facility cost reasonable. In effecting such splitting, however, it is difficult to maintain the same gas/liquid ratio in the substreams as in the main flow, due to the separation of the phases in the multiphase flow at the branching location. In general, the higher density phase (e.g., liquid) tends to flow in the least deviated pipe branch because of its greater momentum, while the lower density phase (e.g., gas) will tend to flow into the most deviated pipe branch. This problem has been addressed in the art by mixing devices, generally referred to as "mixers", an evenly dispersed, or mixed, multiphase flow stream may be accurately split at a branch in the piping system, thus achieving uniform gas/liquid ratio among the branched substreams.

A conventional class of mixers that are of particular benefit in large piping networks are static mixers, which are placed in-stream in the piping network. The mixers are referred to as static, in that the mixing action results from turbulence in the flow stream caused by the structure of the mixer; no motor drive is necessary, making the cost and operation of the mixers attractively low for large and remote piping networks. As described in the above-incorporated U.S. Pat. No. 5,421,408, a conventional static mixer is constructed as a plurality of axially spaced mixing segments, each of which have several radially projecting, circumferentially spaced, pitched blades. The segments and blades are stationary within the piping conduit, and thus serve to impart a spiral direction of flow in the stream passing through the mixer. The relative direction, pitch, and location of the various segments and blades are selected to obtain the desired turbulence and mixing action of the stream. In the piping network described in the above-incorporated U.S. Pat. No. 5,421,408, these static mixers are placed at the locations of branches, for example at across the ports forming the branch intersections or at junctions of conduits.

It has been found, in connection with the present invention, that static mixers of conventional design, while performing reasonably well at high flow rates, do not function very well at low flow rates, because the only available energy for producing the turbulence is the kinetic energy of the liquid itself. In addition, it has been found, in connection with the present invention, that the performance of static mixers of the conventional helical design noted above is quite dependent upon the mixer dimensions. As such, conventional static mixers cannot be readily scaled to various pipe diameters. Accordingly, while a number of helical static mixers are known in the art and commercially available, it is believed that none perform well at low flow rates, and that none are scaleable over a useful range of pipe diameters.

BRIEF SUMMARY OF THE INVENTION

It is therefore an object of the present invention to provide a static mixer for use in multiphase piping networks.

It is a further object of the present invention to provide such a static mixer that may be readily scaled to various pipe diameters.

It is a further object of the present invention to provide such a static mixer that mixes multiphase flow streams well even at low flow rates.

It is a further object of the present invention to provide such a static mixer that is applicable in the mixing of gas and liquid phases, as used in the simultaneous injection of gas and water into hydrocarbon-bearing formations of the earth at well locations.

Other objects and advantages of the present invention will be apparent to those of ordinary skill in the art having reference to the following specification together with its drawings.

The present invention may be implemented into a packed bed static mixer device and piping network including the same, constructed to be oriented in substantially a vertical direction. The packed bed includes individual components having a relatively small size, which determines the size of vortices in the flow. The material from which the packing is constructed may be selected according to the properties of the flow constituents. Branched outlets from the mixer horizontally and radially extend from the bottom of the mixer.

DETAILED DESCRIPTION OF THE INVENTION

Before describing the packed bed static mixer and associated piping networks according to the present invention, it is believed to be helpful to discuss the theory of operation of the mechanism of turbulent mixing, and particularly the scaling of such mixing at different diameters of flow. An understanding of this theory of operation will be beneficial to those of ordinary skill in the art, particularly in appreciating the full scope of the present invention as claimed below.

Figure 1A:
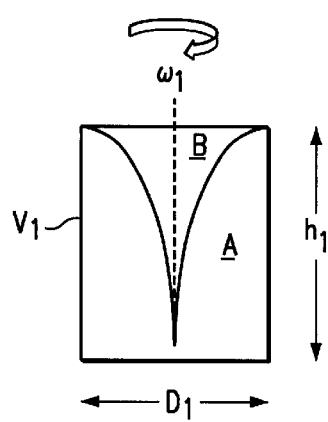
FIGS. 1a and 1b illustrate vortices of varying diameter.

It has been observed, in connection with the present invention, that the primary mechanism of mixing in a multiphase flow stream is micro-scale vorticity, according to which mixing of a multiphase flow is promoted by the generation of a small vortex, such as vortex $V_1$ of FIG. 1a. As shown in FIG. 1a, vortex $V_1$ of a multiphase fluid has a diameter $D_1$, a height $h_1$, and an angular velocity $\omega_1$, associated therewith. Fluids A and B occupy the locations indicated in vortex $V_1$, as fluid B is the higher density fluid in this example. For purposes of this description, fluid A has a density $\rho_A$ and a viscosity $\mu_A$, while fluid B has a density $\rho_B$ and a viscosity $\mu_B$. In the micro-scale, the extent of mixing in the flow volume in vortex $V_1$ is directly related to the depth $D_1$ of vortex $V_1$. According to fundamental fluid mechanics, the Narier-Stokes equations of motion of fluid B in vortex $V_1$ of FIG. 1a are as follows:

$$\frac{D v^*}{Dt} = -\nabla^* P^* + \left[\frac{\mu}{D_1 \overline{U} \rho_B}\right]\nabla^{*2} v^* + \left[\frac{gD_1}{U^2}\right]\frac{\overline{g}}{g}$$

$$\frac{D v^*}{Dt} = -\nabla^* P^* + \left[\frac{1}{N_{Re1}}\right]\nabla^{*2} v^* + \left[\frac{1}{N_{Fr1}}\right]\frac{\overline{g}}{g}$$

The terms $N_{Re1}$ and $N_{Fr1}$ are defined as follows:

$$N_{Re1} = \frac{\rho_B \omega_1 D_1^2}{\mu_B}$$

$$N_{Fr1} = \frac{\omega_1^2 D_1}{g}$$

Figure 1B:
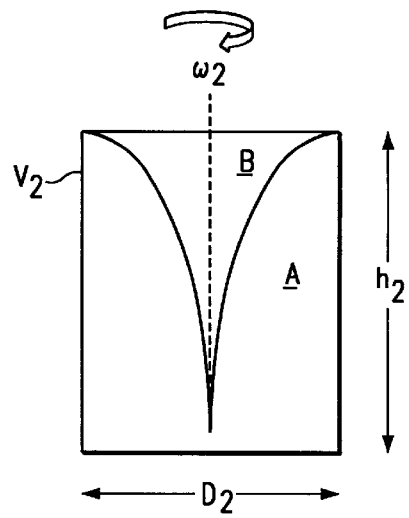

FIG. 1b illustrates vortex $V_2$, which has a larger diameter $D_2$ than that of vortex $V_1$. In order for the same mixing action to occur in vortex $V_2$ as in vortex $V_1$, for the same fluids A, B, the depth $h_2$ of vortex $V_2$ must scale with diameter $D_2$, or:

$$\frac{h_1}{D_1} = \frac{h_2}{D_2}$$

To accomplish this scaling, the equations of motion applicable to vortex $V_2$ must correspond to those of vortex $V_1$ so that:

$$N_{Re1} = N_{Re2}$$

and $$N_{Fr1} = N_{Fr2}$$

From the equality $N_{Fr1} = N_{Fr2}$, the requirement of equal mixing in the two vortices $V_1$, $V_2$ requires:

$$\frac{\omega_1^2 D_1}{g} = \frac{\omega_2^2 D_2}{g}$$

or equivalently:

$$\frac{\omega_2}{\omega_1} = \sqrt{\frac{D_1}{D_2}}$$

But considering the equality $N_{Re1} = N_{Re2}$, and by substituting thereinto the relationship for the ratio of angular velocities as corresponding to the square root of the reciprocal of the diameters, it has been realized according to the present invention that:

$$\frac{\rho_B \omega_1 D_1^2}{\mu_B} = \frac{\rho_B \omega_2 D_2^2}{\mu_B}$$

Upon eliminating common terms, this equality forces the result that:

$$\frac{\mu_B}{\rho_B} = \frac{\mu_B}{\rho_B}\left(\frac{D_2}{D_1}\right)^{\frac{3}{2}}$$

which is true only for the trivial case where the diameters $D_1$, $D_2$ are the same. As a result, proper consideration of the $N_{Fr}$ term in the Narier-Stokes equation requires the conclusion that equal mixing of multiphase components in the flow stream cannot be scaled with the diameter of the flow. It is believed that the $N_{Fr}$ term is typically neglected in conventional fluid mechanics problems, as typically only one constituent phase is present in the flow. However, consideration of the $N_{Fr}$ term in this analysis clearly points out the inability to scale conventional static mixers, such as of the helical design discussed above, in such a manner as to maintain the same extent of mixing over a range of diameters. In other words, a static mixer design that provides good performance at one pipe diameter will not necessarily perform similarly when scaled for use in a larger (or smaller) diameter pipe.

Figure 2:
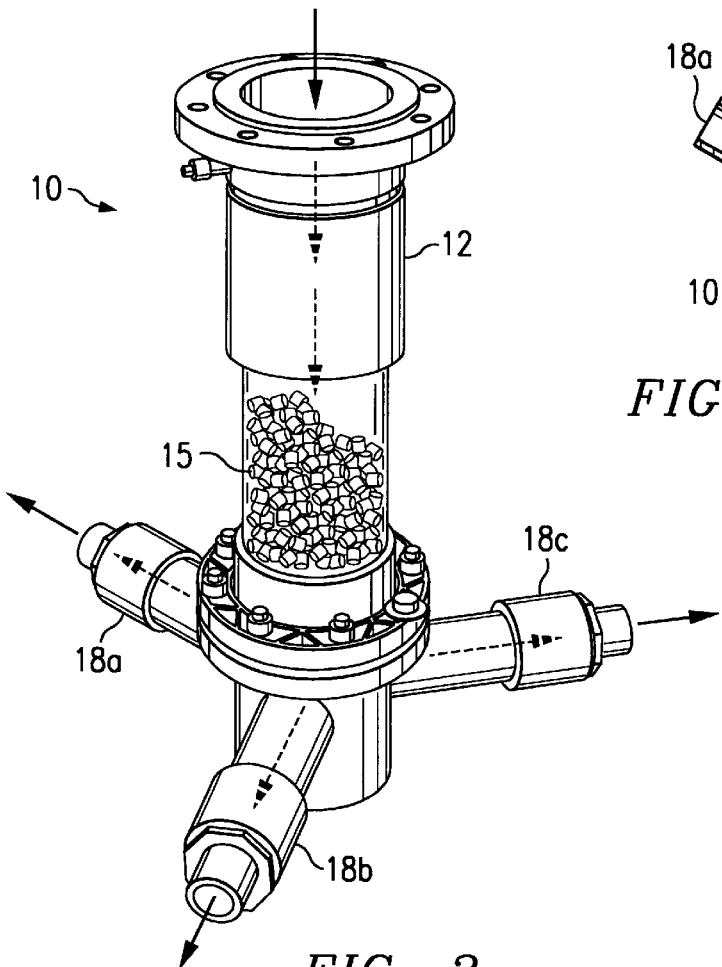
FIG. 2 is a perspective view of a packed bed static mixer according to the preferred embodiment of the invention.
Figure 3:
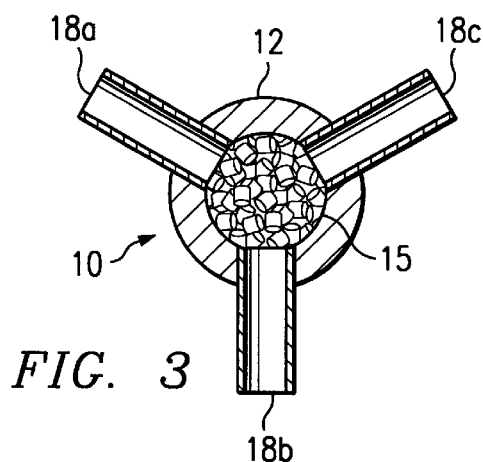
FIG. 3 is a plan, cross-sectional, view of the packed bed static mixer of FIG. 1.

Referring now to FIGS. 2 and 3, the construction of packed bed static mixer 10 according to the preferred embodiment of the present invention will now be described in detail. As illustrated in the perspective view of FIG. 2, packed bed static mixer 10 has a vertical intake portion 12, within which packing 15 is disposed (to at least some substantial height therein), and has multiple outlets 18 (in this example, three) which extend radially from the bottom of intake 12, and which are disposed horizontally in this example. In a specific example of packed bed static mixer 10, intake 12 is approximately six inches in inside diameter and approximately twelve inches in height, while outlets 18a, 18b, 18c are each approximately three inches in inside diameter. The relative sizes of intake 12 and outlets 18 will, of course, depend upon the desired flows in the piping network into which packed bed static mixer 10 is to be deployed.

According to the present invention, packing 15 provides many small mixing vortices. Packing 15, according to the preferred embodiment of the invention, includes a relatively large number of small elements that are packed together within packed bed static mixer 10 so as to have interstitial voids therebetween. It is contemplated that the size of the mixing vortices in packed bed static mixer 10 is defined by the size of the voids present between adjacent ones of the elements of packing 15. The specific size of these voids is not believed to be critical, so long as the voids are sufficiently large as to induce von Karman vorticity in the fluids being mixed therein. On the other hand, to obtain good mixing, it is preferable to provide a reasonable number of such vortices within packed bed static mixer 10; with a sufficient number of elements of packing 15 (and thus a sufficient number of vortices), the particular efficiency of mixing at a given vortex need not be optimized in order to mix the phases.

Figure 4A:
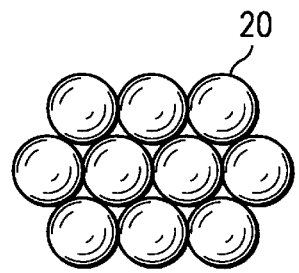
FIGS. 4a through 4c are perspective views of various types of packing material for the packed bed static mixer according to the preferred embodiment of the invention.

Packing 15 may be provided in many alternative realizations, according to the present invention. FIG. 4a illustrates a first realization of packing 15, consisting of closely packed, uniformly sized, spherical elements 20. When closely packed as illustrated in FIG. 4a, spherical elements 20 provide numerous voids of uniform dimension. As noted above, the size of spherical elements 20, and thus the size of the interstitial voids, must at least be sufficient to induce von Karman vorticity in the fluids, but are preferably sufficiently small as to provide a good number of such voids; for example, spherical elements 20 of a diameter of on the order of 1 cm are contemplated to be suitable for mixing carbon dioxide and water in a six-inch inside diameter intake portion 12 of packed bed static mixer 10. In the alternative, randomly arranged spherical elements of non-uniform size may be used to produce voids of non-uniform dimension.

Figure 4B:
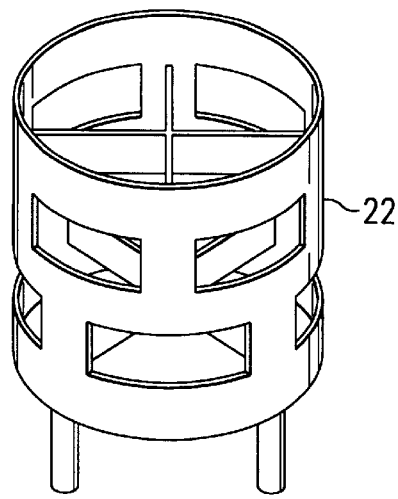

FIG. 4b illustrates another example of packing element 22, which may be used in another realization of packing 15. In this example, element 22 is of an irregular shape, such as the shape of a PALL RING packing element, which is a conventional packing element of a hollow, cylindrical shape, with several slots along its sides which extend into the interior of the defined cylinder. In this example, packing element 22 is fabricated of TEFLON synthetic resin polymer or another plastic material. In operation, many packing elements 22 are incorporated into packed bed static mixer 10 by close random packing with one another. Each packing element 22 according to this embodiment of the invention is on the order of 17 mm in diameter and 19 mm in length. Because of their shape and size, packing elements 22 provide a large number of mixing vortices, of various dimension, when closely packed into packed bed static mixer 10. The use of irregular packing elements 22 will be particularly desirable if the pressure drop through packed bed static mixer 10 is to be minimized, as will be described hereinbelow.

Figure 4C:
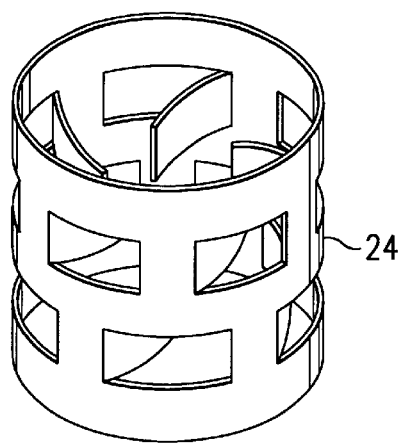

FIG. 4c illustrates another example of packing element 24 suitable for use in connection with the preferred embodiment of the invention. In this example, packing element 24 is fabricated of stainless steel, and is also in the shape of a PALL RING packing element; the shape of packing element 24 in this example derives from its manufacture by way of the stamping and bending of a small corresponding sheet of stainless steel. Packing element 24 in this example has a diameter of about 15 mm and a length of 15 mm, and will be deployed by close random packing into packed bed static mixer 10.

Packing 15, in its various realizations including elements 20, 22, 24 described hereinabove, may be fabricated from various materials depending upon the nature of the fluids to be mixed thereby. For example, if strong hammering by "slugs" of the liquid phase may occur in packed bed static mixer 10, the material of packing 15 and the shape of its elements are preferably selected to have sufficient structural integrity so as to stand up to such hammering over time; in this environment, spherical elements 20 as described above, fabricated of steel, would be a preferred realization. Additionally, if the fluids to be mixed by packed bed static mixer 10 are corrosive, a material with high resistance to corrosion, such as stainless steel or TEFLON synthetic resin polymer, is preferred.

The vertical orientation of intake portion 12 of packed bed static mixer 10 is preferred, according to the present invention, to ensure that the multiple phases of the flow stream are applied to packing 15 in a well-mixed manner. This vertical orientation avoids stratification or other separation that may exist in a horizontal intake. In this way, each of the mixing vortices present within packing 15 of packed bed static mixer 10 will receive flow that is at substantially the same gas-liquid ratio as that received at the other vortices. As a result, the mixed output from each vortex will be substantially uniform over packed bed static mixer 10, so that the output from outlets 18a, 18b, 18c will also be at a uniform gas-liquid ratio. Branching of the multiphase flow stream received at intake portion 12 of packed bed static mixer 10, into the multiple outlets 18, is thereby achieved in a manner that preserves the gas-liquid ratio.

As noted above, the mixing mechanism within packed bed static mixer 10 according to the preferred embodiment of the invention occurs at each of the vortices within packing 15. As such, the scaling of packed bed static mixer 10 to different sizes of intake portion 12 or outlets 18 does not affect the mixing mechanism occurring within packing 15. Instead, an increase or decrease in the size of intake portion 12 of packed bed static mixer 10 will simply change the number of vortices therewithin; as a result, the mixing performance of packed bed static mixer 10 will not be sensitive to size, as is the case in conventional helix static mixers. Additionally, mixing performance of packed bed static mixer 10 according to the preferred embodiment of the present invention is also not sensitive to the size and number of outlets 18.

It has further been verified, by experiment, that excellent mixing performance is obtained from packed bed static mixer 10, constructed according to the present invention, at low flow rates. In an experimental example, a six-foot long horizontal section of 6" pipe was connected to a packed bed static mixer 10 according to the preferred embodiment of the invention, via a smooth turn elbow to permit vertical orientation of packed bed static mixer 10. In this example, packed bed static mixer 10 included three 3" outlets as illustrated in FIGS. 2 and 3, to direct the mixed flow to three separation tanks at which flow rates were measured. Packing 15 in this example was realized as PALL RING packing elements, similar to irregular elements 22 described hereinabove relative to FIG. 4, each of which was ¾ inch in diameter and length, and packed to a depth of twelve inches. In the experiment, a mixture of air and water was pumped into packed bed static mixer 10 at varying flow rates.

At a flow pressure of 10 psi, uniformity of gas-liquid ratios between the intake portion 12 and outlets 18 remained within about 10% over varying gas-liquid ratios from about 0.15 to about 0.40. This uniformity was maintained even at a low superficial flow velocity of about 0.3 ft/sec. Because splitting is a purely cinematic phenomenon, it is believed that excellent mixing will similarly be effected at higher superficial velocities.

Figure 5:
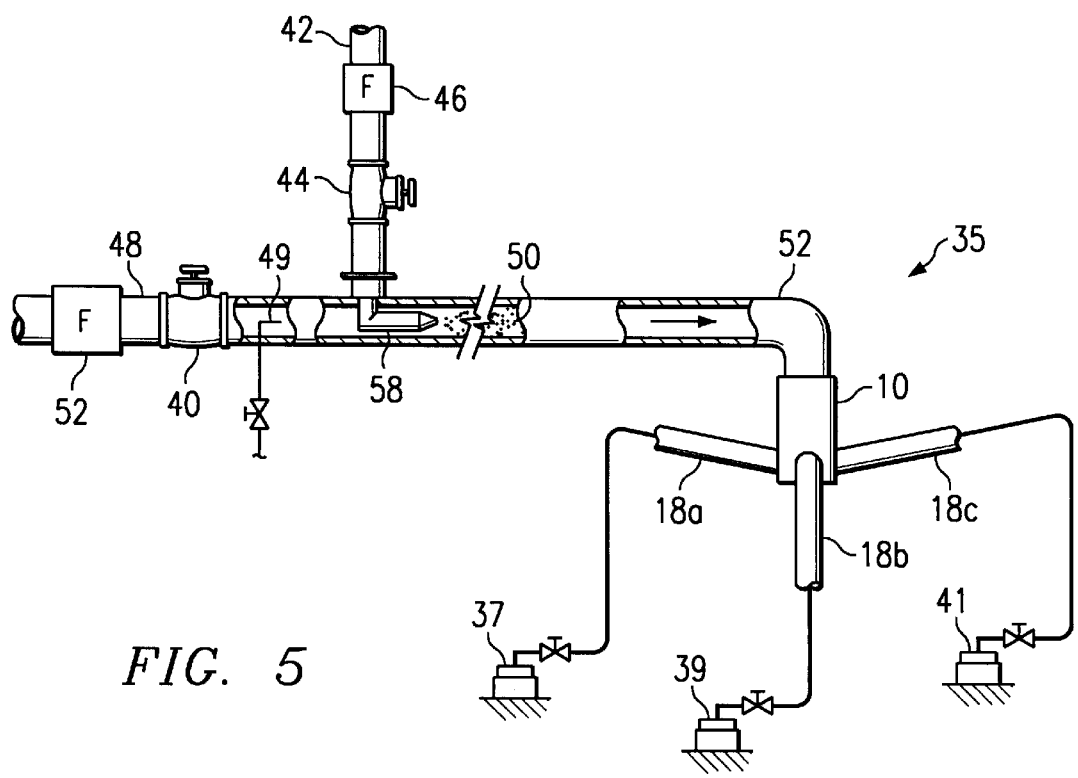
FIG. 5 is a schematic view of a piping network including the packed bed static mixers according to the preferred embodiment of the invention.

Referring now to FIG. 5, an example of an application of packed bed static mixer 10 in a piping network 35, such as may be used in the simultaneous injection of gas and water as a secondary recovery operation in a producing oil and gas field. In this example, wells 37, 39, 41 are to receive simultaneous gas and water injection, at a common gas-liquid ratio thereamong. The exemplary network 35 of FIG. 5 is greatly simplified from that which may typically be present in an actual field, for purposes of clarity of description. It is, of course, to be understood that packed bed static mixer 10 may of course be utilized in other applications, such as other piping networks, as well as in other industrial uses that utilize multiphase flow streams, such as chemical processing plants.

In network 35 of FIG. 5, a gas phase (e.g., carbon dioxide) is applied to gas supply conduit 42, which includes a conventional throttling valve 33 and a flowmeter 46 interposed therein. A liquid, namely water, is applied to water supply conduit 48, which includes throttling valve 40 and flowmeter 52 therein. Nozzle 58 injects the gas from gas conduit 42 into conduit 50, at which location the two phases of water and carbon dioxide merge. Conduit 50 thus carries a multiphase flowstream. Overflow valve 49 is provided in water supply conduit 48 to further adjust the gas-liquid ratio (beyond that determined by valves 40, 44).

Conduit 50 is disposed in substantially a horizontal orientation, as is typical for piping networks in which some distance between the source and destinations is to be covered. At a location that is near wells 37, 39, 41, smooth turn elbow 52 receives conduit 50, and directs the multiphase flowstream downwardly, to reach packed bed static mixer 10 in a substantially vertical orientation. In this example, packed bed static mixer 10 is constructed as described hereinabove. The vertical orientation of the flow into packed bed static mixer 10 is desirable in providing a relatively well-mixed intake flow thereinto.

Packed bed static mixer 10 performs the thorough mixing operation described hereinabove, and splits the multiphase flowstream into three flows which exit via outlets 18a, 18b, 18c. These flows are then applied to wells 37, 39, 41, as illustrated in FIG. 5, and injected into the underlying formation to effect the secondary recovery process. As discussed in detail hereinabove, piping network 35, which includes packed bed static mixer 10 constructed according to the preferred embodiment of the present invention, is thus able to simultaneously inject gas and water into wells 37, 39, 41, with a gas-liquid ratio at each of wells 37, 39, 41 that closely matches that determined by valves 40, 44 at the source end of network 35.

Also as discussed above, the packed bed static mixer of the present invention may be readily scaled to different pipe diameters without requiring redesign of the static mixer parameters. Such scalability is especially beneficial in complicated piping networks in which branches of different sizes may be desirable.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A packed bed static mixer for mixing a multiphase flow, comprising:
   an intake portion, having a first diameter about a first axis, and having a single intake opening at one end for receiving the multiphase flow;
   packing, disposed within the intake portion, and comprising a plurality of packing elements, each element having a size that is significantly smaller than the first diameter; and
   a plurality of outlets disposed near another end of the intake portion, each of the plurality of outlets for coupling to a conduit, and having an axis oriented at an angle relative to the first axis.

2. The static mixer of claim 1, wherein the first axis is oriented vertically, with the intake opening at the top of the intake portion;
   and wherein the axis of each of the plurality of outlets extends perpendicularly from the first axis.

3. The static mixer of claim 1, wherein each of the plurality of outlets has a second diameter, the second diameter being smaller than the first diameter.

4. The static mixer of claim 1, wherein the packing comprises:
   a plurality of spherical elements.

5. The static mixer of claim 1, wherein the packing comprises:
   a plurality of packing elements of irregular shape.

6. The static mixer of claim 1, wherein each of the plurality of elements of the packing is constructed of steel.

7. The static mixer of claim 1, wherein each of the plurality of elements of the packing is constructed of a synthetic resin polymer.

8. A piping network, comprising:
   a first conduit for transporting a liquid;
   a second conduit for transporting a gas;
   a third conduit, connected to the first and second conduits, for conducting a multiphase flow including liquid from the first conduit and gas from the second conduit;
   a static mixer, comprising:
      an intake portion, having a first diameter about a first axis, and having a single intake opening at one end, and connected to the third conduit for receiving the multiphase flow therefrom;
      packing, disposed within the intake portion, and comprising a plurality of closely packed packing elements, each element having a size that is significantly smaller than the first diameter; and
      a plurality of outlets disposed near another end of the intake portion, each of the plurality of outlets having an axis oriented at an angle relative to the first axis; and
   a plurality of destination locations, each coupled to receive flow from a corresponding one of the plurality of outlets of the static mixer.

9. The piping network of claim 8, wherein the first axis is oriented vertically, with the intake opening at the top of the intake portion;

and wherein the axis of each of the plurality of outlets extends perpendicularly from the first axis.

10. The piping network of claim 8, wherein each of the plurality of outlets has a second diameter, the second diameter being smaller than the first diameter.

11. The piping network of claim 8, wherein the packing comprises:

a plurality of spherical elements.

12. The piping network of claim 8, wherein the packing comprises:

a plurality of packing elements of irregular shape.

13. The piping network of claim 8, wherein each of the plurality of elements of the packing is constructed of steel.

14. The piping network of claim 8, wherein each of the plurality of elements of the packing is constructed of a synthetic resin polymer.

15. The piping network of claim 8, wherein a portion of the third conduit extends substantially horizontally;

and further comprising:

an elbow, connected between the third conduit and the static mixer, for directing flow from the third conduit downwardly into a substantially vertical direction;

wherein the first axis is oriented vertically, with the intake opening at the top of the intake portion;

and wherein the plurality of outlets each extend in a horizontal orientation from the bottom of the intake portion.

16. The piping network of claim 8, wherein the destination locations correspond to hydrocarbon wells.

\* \* \* \* \*